US012777419B2

(12) United States Patent
Huang et al.

(10) Patent No.: US 12,777,419 B2
(45) Date of Patent: Oct. 27, 2026

(54) SYSTEMS AND METHODS FOR CONTROLLING DATA TRANSFERS FOR USER EQUIPMENTS IN HIGH DENSITY AREAS

(71) Applicant: Verizon Patent and Licensing Inc., Basking Ridge, NJ (US)

(72) Inventors: Ye Huang, San Ramon, CA (US); Jodi S. Bogen, Alpharetta, GA (US); Sameer Muhammad Farooqi, Frisco, TX (US); Suzann Hua, Beverly Hills, CA (US); Jin Yang, Orinda, CA (US); Robert Avanes, Roanoke, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 319 days.

(21) Appl. No.: 18/420,279

(22) Filed: Jan. 23, 2024

(65) Prior Publication Data

US 2025/0240722 A1 Jul. 24, 2025

(51) Int. Cl.

| | |
|---|---|
| ***H04W 4/00*** | (2018.01) |
| ***H04L 43/0882*** | (2022.01) |
| ***H04W 4/14*** | (2009.01) |
| ***H04W 52/02*** | (2009.01) |

(52) U.S. Cl.
CPC ..... *H04W 52/0235* (2013.01); *H04L 43/0882* (2013.01); *H04W 4/14* (2013.01); *H04W 52/0219* (2013.01)

(58) Field of Classification Search
CPC .............. H04W 52/0235; H04W 4/14; H04W 52/0219
See application file for complete search history.

(56) References Cited

U.S. PATENT DOCUMENTS

| | | | | |
|---|---|---|---|---|
| 2019/0124671 | A1* | 4/2019 | Starsinic | H04W 12/06 |
| 2022/0182938 | A1* | 6/2022 | Ye | H04W 76/28 |
| 2022/0240182 | A1* | 7/2022 | Baldemair | H04W 52/0229 |
| 2024/0267988 | A1* | 8/2024 | Zhou | H04W 72/23 |
| 2024/0284331 | A1* | 8/2024 | Bhatoolaul | H04W 52/0245 |
| 2025/0175898 | A1* | 5/2025 | Li | H04W 52/0229 |
| 2025/0220582 | A1* | 7/2025 | Li | H04W 68/02 |
| 2025/0227613 | A1* | 7/2025 | Bastani | H04W 52/0235 |
| 2025/0227784 | A1* | 7/2025 | Balakrishnan | H04W 48/20 |

* cited by examiner

*Primary Examiner* — Abdelnabi O Musa

(57) ABSTRACT

In some implementations, a network device may receive a group command associated with data transfers for a plurality of user equipments (UEs). The network device may transmit, based on the group command, a wakeup signal to a subset of UEs, of the plurality of UEs, in a target area, wherein the wakeup signal is associated with a control of data transfers for the subset of UEs based on a number of UEs in the target area and a load condition level associated with the target area.

20 Claims, 4 Drawing Sheets

100

SYSTEMS AND METHODS FOR CONTROLLING DATA TRANSFERS FOR USER EQUIPMENTS IN HIGH DENSITY AREAS

BACKGROUND

Wireless communication systems are widely deployed to provide various telecommunication services such as telephony, video, data, messaging, and broadcasts. A wireless network may include one or more network nodes that support communication for wireless communication devices.

DETAILED DESCRIPTION OF EXAMPLE EMBODIMENTS

Figure 1:
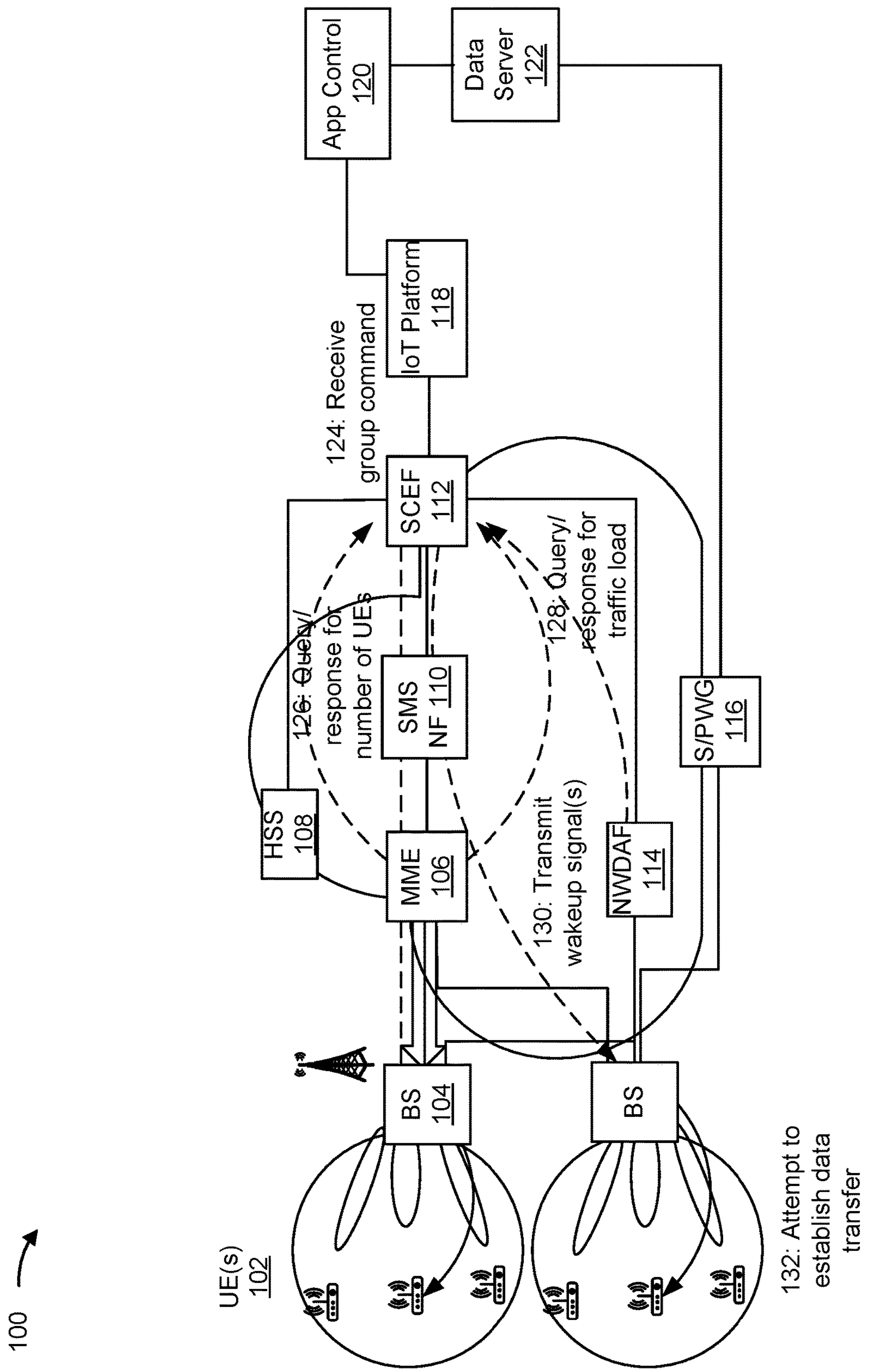
FIG. 1 is a diagram of an example associated with controlling data transfers for user equipments (UEs) in high density areas.

The following detailed description of example implementations refers to the accompanying drawings. The same reference numbers in different drawings may identify the same or similar elements.

A customer application server may transmit wakeup commands via short messaging service (SMS) to densely deployed user equipments (UEs) (or devices, such as Internet of Things (IoT) devices). The customer application server may transmit the wakeup commands to request the UEs to start sending data to a data collection server over a user plane. The user plane may include a packet gateway (PGW) and/or a user plane function (UPF). The wakeup commands (e.g., customer SMS wakeup messages) may be transmitted through carrier SMS gateways (e.g., short message peer-to-peer (SMPP) gateway or enterprise messaging (EMAG)) to message centers and then delivered to the UEs.

As an example, the customer application server may be associated with a utility company. The UEs may include meters, such as electric meters, gas meters, and/or water meters. The UEs may report meter data to the data collection server over the user plane in response to receiving the wakeup commands. The meter data may include usage data (e.g., electric usage, gas usage, and/or water usage). A household may have three connections (e.g., a first connection for electric, a second connection for gas, and a third connection for water).

In a densely populated area, the UEs (which are located proximate to each other) may attempt to initiate uplink data transfer at the same time, which may be based on the customer application server transmitting the wakeup commands to all the UEs in the densely populated area at the same time. For example, the UEs may be requested to report the meter data at the same time once per day. In this case, a relatively high failure rate, a poor customer experience, and/or a relatively high number of customer calls/complaints may occur. Further, cell site congestion and outage due to an access storm and retries may occur, thereby degrading an overall network performance. In other words, when an event triggers a relatively large number of UEs within the densely populated area to attempt to access a wireless network at the same time to report data, a massive storm (or access storm) may be created and none of the UEs (or only a subset of the UEs) may be able to access the wireless network.

A similar problem may occur for a downlink data transfer, such as a firmware download, when the customer application server instructs the UEs to connect to a firmware over-the-air (FOTA) server to download the firmware. In the densely populated area, the UEs may attempt to download the firmware at the same time, which may be based on the customer application server transmitting the wakeup commands to all the UEs in the densely populated area at the same time. In this case, the relatively high failure rate, the poor customer experience, and/or the relatively high number of customer calls/complaints may occur. Further, cell site congestion and outage due to the access storm and retries may occur, thereby degrading the overall network performance.

Some techniques may be implemented to avoid the access storm. A first technique is extended access barring (EAB) between a UE and a base station (e.g., eNB). In EAB, a network may broadcast control information for selected services that UEs support for IoT services. The UEs may retry with randomized back-off algorithms, which may serve to reduce overload on the wireless network. However, in the case of a power outage in a neighborhood (e.g., a neighborhood with 700 homes, where each home has three meters for electric, gas, and water, respectively, and each UE is configured to report usage everyday), the UEs will try to report that the UEs do not have power. The UEs may all try to report a loss of power at the same time, which may create the access storm. In this case, no power loss reports may be received by the wireless network. The access storm may pass but a utility company may not be aware about the power loss until a customer calls the power company.

A second technique may be a low access priority indicator (LAPI). The base station may request UEs with LAPI enabled IoT devices to back off with a randomized time when congestion occurs. With LAPI, the UEs may be pushed back a fixed amount of time. However, for UEs that have lost power, only a finite duration of time is available to report on power loss. When the wireless network pushes the UEs a certain amount of time, power on the UEs may be lost during that time. The UE may not have any transient charge left and the UEs may turn off during that time, such that the UEs are unable to report the power loss.

A third technique is service gap control (SCG). A network may instruct a UE how frequent the UE may initiate an access request. In other words, the network may inform the UE how often the UE can connect to the wireless network. However, in the event of power loss, the UE may have already lost power by the time the UE is allowed to make a connection, thereby causing the UE to be unable to report its power loss.

The three techniques treat all UEs the same at the same given time, which is not suitable for power notifications, power loss notifications, and/or power restore notifications because all of these notifications may occur at the same time for a large number of UEs. In other words, when the UEs experience power loss, such techniques may not be suitable for the UEs to report to the wireless network, thereby degrading an overall system performance.

In some implementations, an adaptive control technique for UEs (e.g., IoT devices) in high density areas may be defined, which may allow the UEs to perform data transfer without causing radio access network (RAN) access storming in a wireless network. The wireless network may be a fourth generation (4G) network, a fifth generation (5G) network, a sixth generation (6G) network, and so on. With the adaptive control technique, the wireless network may obtain information regarding a group of UEs that are trying to access a certain access point. The wireless network may apply procedures of randomization for that specific access point serving the group of UEs, rather than blindly treating all UEs in any given area and at any given time the same.

In some implementations, the wireless network may orchestrate access using network intelligence, which may involve orchestrating access between different access points one at a time. In one example, the access may be for the purpose of reporting power loss. A service capability exposure function (SCEF) in the wireless network may have the capability to monitor the number of UEs that are connecting to a specific access point. The SCEF may retrieve such information and apply intelligence/analytics on that information to randomize access only for the specific access point (e.g., a specific target area). Access may be randomized for a group of UEs that are being served by that access point. The SCEF may grant access to a specific targeted group of UEs at any given time, which may guarantee that a level of service for a remaining UE population is not impacted. In some cases, existing features such as EAB, LAPIs, and/or SCG may be enabled for only the specific targeted group of UEs at any given time. The features may be intelligently applied on a focused group of UEs, instead of blanket coverage for every UE in the wireless network, which would deteriorate a customer experience over a wider geography. The application of existing features may be focused to a relatively small group of UEs, while keeping an experience unchanged for other UEs. The existing features may be applied by the SCEF and/or other downstream elements, which may include a mobility management entity (MME) and/or a RAN.

In some implementations, by adaptively controlling access for UEs in high density areas, the UEs may be able to perform data transfer (e.g., reporting power status updates) without causing RAN access storming in the wireless network. The UEs may be able to initiate an uplink data transfer and/or receive a downlink data transfer without causing the RAN access storming. Groups of UEs associated with certain access points may be permitted to access the wireless network one at a time, instead of a plurality of UEs associated with a plurality of access points being instructed to access the wireless network at the same time, which may prevent the RAN access storming and improve an overall network performance.

FIG. 1 is a diagram of an example 100 associated with controlling data transfers for UEs in high density areas. As shown in FIG. 1, example 100 includes a plurality of UEs 102, one or more base stations 104 (e.g., eNB), an MME 106, a home subscriber server (HSS) 108, a short messing service (SMS) network function (NF) 110 (or a non-Internet Protocol (non-IP) data delivery (NIDD) NF), a network exposure function (NEF) SCEF (NEF-SCEF) 112, a network data analytics function (NWDAF) 114, a serving/packet gateway 116, an IoT platform 118, an application controller 120, and a data server 122. Each base station 104 may be associated with a subset of UEs 102, where the subset of UEs 102 may be of the plurality of UEs 102. The plurality of UEs 102, the one or more base stations 104, the MME 106, the HSS 108, the SMS NF 110 (or the NIDD NF), the NEF-SCEF 112, the NWDAF 114, the serving/packet gateway 116, the IoT platform 118, the application controller 120, and/or the data server 122 may be associated with a wireless network, such as a 4G network or a 5G network.

As shown by reference number 124, the NEF-SCEF 112 may receive, from a customer application server, which may be associated with the application controller 120, a group command associated with data transfers for the plurality of UEs 102. The plurality of UEs 102 may be associated with a plurality of target areas. The data transfers may be uplink data transfers or downlink data transfers. The customer application server may invoke the group command for a large number of UEs that need to upload or download data.

As shown by reference number 126, the NEF-SCEF 112 may transmit, to the MME 106 and/or an application and management function (AMF), a query for information regarding a number of UEs 102 in a target area, of the plurality of target areas, and the NEF-SCEF 112 may receive, from the MME 106 and/or the AMF, a response indicating the number of UEs 102 in the target area. The number of UEs 102 in the target area may be per RAT type based on a RAN resource allocation. The NEF-SCEF 112 may be able to subscribe to the number of UEs 102 filtered by RAT. The target area may be associated with a cell or a base station. The NEF-SCEF 112 may query and/or subscribe to the number of UEs 102 (e.g., IoT UEs) in the target area for scheduling an activity associated with data transfer. A query/subscribe signaling and/or response may indicate a cell identifier, a RAT, and/or the number of UEs 102. In other words, the number of UEs 102 indicated by the MME 106 and/or the AMF may be associated with a given cell identifier and a given RAT. The MME 106, the AMF, and a RAN (e.g., eNB/gNB) may allow a query/subscribe associated with a RAT type based number of UEs.

As shown by reference number 128, the NEF-SCEF 112 may transmit, to the NWDAF 114, a query for information regarding a load condition level associated with the target area, and the NEF-SCEF 112 may receive, from the NWDAF 114, a response indicating the load condition level associated with the target area. The load condition level associated with the target area may account for predicted future traffic associated with the target area. The NEF-SCEF 112 may maintain a cell-RAT based load map database with RAT type based UEs 102 in cells and a capacity of the cells. The NEF-SCEF 112 may subscribe to a cell site load condition (e.g., the NEF-SCEF 112 may be notified when a high load or overload occurs), and the NEF-SCEF 112 may use such information to update an NEF-SCEF database, such as the cell-RAT based load map database. The NEF-SCEF 112 may query/subscribe to a network status event, which involve information associated with the cell identifier, a narrowband IoT traffic status, and/or trends in traffic, and such information may be obtained from the NWDAF 114.

As shown by reference number 130, the NEF-SCEF 112 may transmit, based on the group command, a wakeup signal to a subset of UEs 102, of the plurality of UEs 102, in the target area. The wakeup signal may be associated with a control of data transfers (or a scheduling of data transfers) for the subset of UEs 102 based on the number of UEs 102 in the target area and/or the load condition level associated with the target area. The wakeup signal may indicate service gap control information to control UE-network uplink transfer attempts per time interval. The wakeup signal may indicate uplink or downlink rate control per access point name (APN) for control plane based transfer. The wakeup signal may indicate a user plane data rate. The wakeup signal may be an SMS wakeup command or a NIDD wakeup command. The wakeup signal may be associated with a paced trigger for mobile origination (MO) data to multiple target areas. The NEF-SCEF 112 may transmit the wakeup signal based on an algorithm to handle group requests and dispatch paced wakeup messages (SMS or NIDD) to the subset of UEs 102.

In some implementations, an NEF-SCEF based architecture may be used with signaling procedures and an intelligence database build in the NEF-SCEF 112. The NEF-SCEF 112 may control and/or pace the data transfer sessions based on the number of UEs 102 in the target area (cell/xNB, where xNB refers to an eNB or a gNB) per RAT type due to the RAN resource allocation to maximize usage. The NEF-SCEF 112 may also control and/or pace the data transfer sessions based on target area (cell/xNB) load condition levels and trajectory (e.g., traffic predictions). The NEF-SCEF 112 may issue an SMS or NIDD wakeup command to the subset of UEs 102 in the target area (or multiple subsets of UEs 102 in multiple target areas, respectively) based on the load condition levels and trajectory. The SMS or NIDD wakeup command may indicate the service gap control information to control the UE-network uplink transfer attempts per time interval, the uplink/downlink rate control per APN for control plane based transfer, and/or the user plane data rate. The NEF-SCEF 112 may perform round-robin based sharing when UEs 102 from multiple IoT customers are present and when more than one IoT server requests for data transfer activity. In some cases, such calculation and pacing, as implemented by the NEF-SCEF 112, may also be implemented in another carrier service platform or customer application server.

As shown by reference number 132, the subset of UEs 102 in the target area may transmit uplink data to the base station 104 in accordance with an uplink data transfer session. For example, the subset of UEs 102 may each report meter data (e.g., electric usage data, gas usage data, and/or water usage data) to the base station 104. As another example, the subset of UEs 102 may each report power status data (e.g., an indication of power loss) to the base station 104. Alternatively, the subset of UEs 102 in the target area may receive downlink data from the base station 104 in accordance with a downlink data transfer session. For example, the subset of UEs 102 may each be able to download firmware from the base station 104. The subset of UEs 102 may attempt to establish a control plane based data transfer for uplink/downlink data, which may be based on NIDD, SMS, message queuing telemetry transport (MQTT), and/or lightweight machine-to-machine (LWM2M). The subset of UEs 102 may attempt to establish a user plane based data transfer for uplink/downlink data, which may be based on a packet data network (PDN), a protocol data unit (PDU), MQTT, and/or LWM2M.

In some implementations, the NEF-SCEF 112 may only transmit the wakeup signal to the subset of UEs 102 in the target area, and after the subset of UEs 102 have had an opportunity to respond, the NEF-SCEF 112 may transmit the wakeup signal to another subset of UEs 102 in another target area. The NEF-SCEF 112 may systematically transmit the wakeup signal to different groups of UEs 102 at a time, where the NEF-SCEF 112 may identify the subsets of UEs 102 based on the number of UEs 102 in a given target area per RAN type and/or the load condition level associated with the given target area. The NEF-SCEF 112 may adaptively control access for UEs 102 in high density areas, such that the UEs 102 may be able to perform data transfer (e.g., reporting power status updates) without causing RAN access storming in the wireless network. The UEs 102 may be able to initiate uplink/downlink data transfers without causing the RAN access storming. Subsets of UEs 102 associated with certain target areas may be permitted to access the wireless network one at a time, instead of the plurality of UEs 102 associated with the plurality of target areas (or access points) being instructed to access the wireless network at the same time, which may prevent the RAN access storming and improve an overall network performance.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
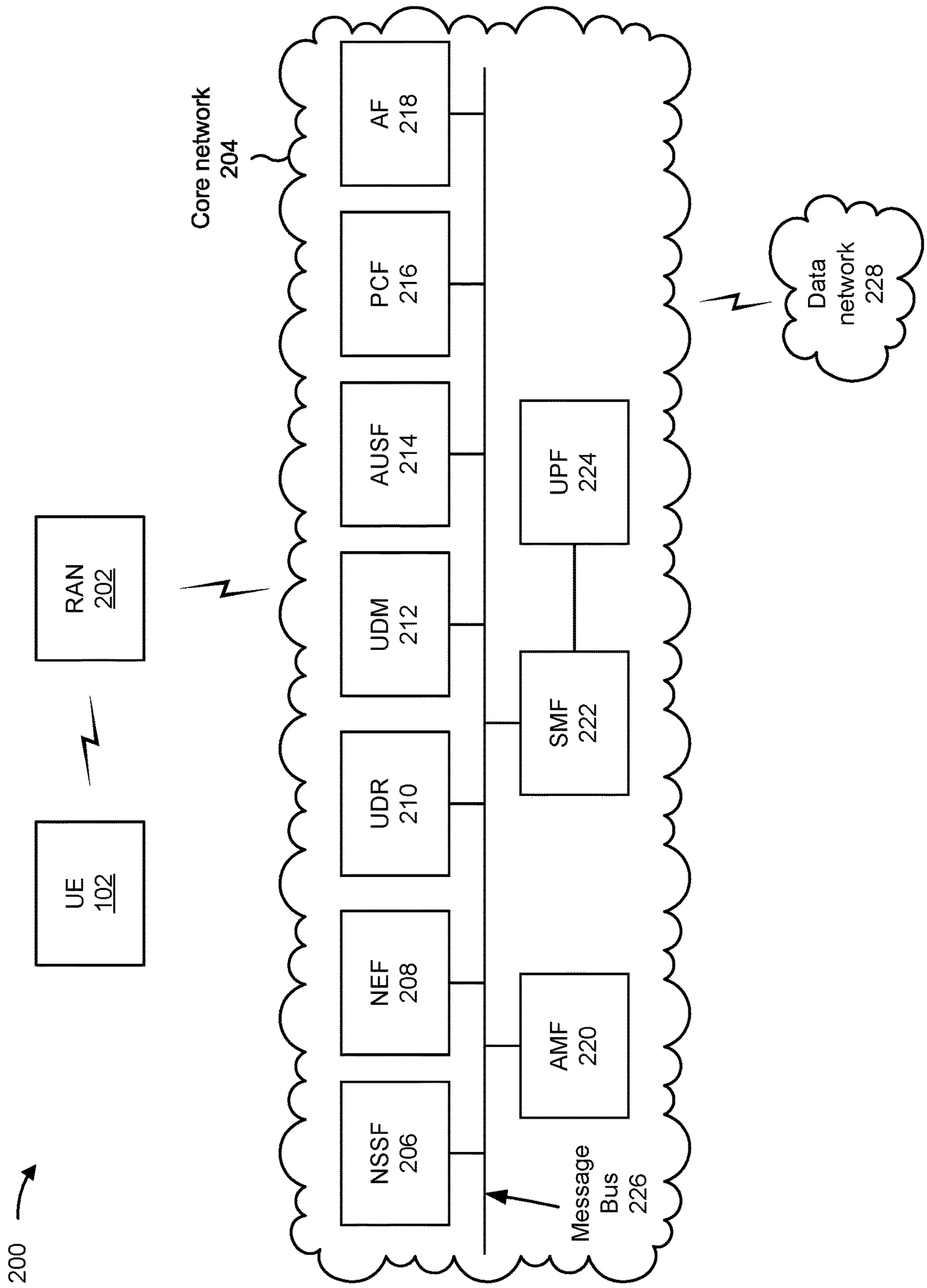
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a UE 102, a RAN 202, a core network 204, and a data network 228. Devices and/or networks of example environment 200 may interconnect via wired connections, wireless connections, or a combination of wired and wireless connections.

The UE 102 may include one or more devices capable of receiving, generating, storing, processing, and/or providing information, such as information described herein. For example, the UE 102 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 202 may support, for example, a cellular radio access technology (RAT). The RAN 202 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 102. A base station may be a disaggregated base station. The disaggregated base station may be configured to utilize a protocol stack that is physically or logically distributed among two or more nodes, which may include a radio unit (RU), a distributed unit (DU), and a centralized unit (CU). The RAN 202 may transfer traffic between the UE 102 (e.g., using a cellular RAT), one or more base stations (e.g., using a wireless interface or a backhaul interface, such as a wired backhaul interface), and/or the core network 204. The RAN 202 may provide one or more cells that cover geographic areas.

In some implementations, the RAN 202 may perform scheduling and/or resource management for the UE 102 covered by the RAN 202 (e.g., the UE 102 covered by a cell provided by the RAN 202). In some implementations, the RAN 202 may be controlled or coordinated by a network controller, which may perform load balancing, network-level configuration, and/or other operations. The network controller may communicate with the RAN 202 via a wireless or wireline backhaul. In some implementations, the RAN 202 may include a network controller, a self-organizing network (SON) module or component, or a similar module or component. In other words, the RAN 202 may perform network control, scheduling, and/or network management functions (e.g., for uplink, downlink, and/or sidelink communications of the UE 102 covered by the RAN 202).

In some implementations, the core network 204 may include an example functional architecture in which systems and/or methods described herein may be implemented. For example, the core network 204 may include an example architecture of a 5G next generation (NG) core network included in a 5G wireless telecommunications system. While the example architecture of the core network 204 shown in FIG. 2 may be an example of a service-based architecture, in some implementations, the core network 204 may be implemented as a reference-point architecture and/or a 4G core network, among other examples.

As shown in FIG. 2, the core network 204 may include a number of functional elements. The functional elements may include, for example, a network slice selection function (NSSF) 206, a network exposure function (NEF) 208, a unified data repository (UDR) 210, a unified data management (UDM) 212, an authentication server function (AUSF) 214, a policy control function (PCF) 216, an application function (AF) 218, an AMF 220, a session management function (SMF) 222, and/or a UPF 224. These functional elements may be communicatively connected via a message bus 226. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 206 may include one or more devices that select network slice instances for the UE 102. The NSSF 206 may allow an operator to deploy multiple substantially independent end-to-end networks potentially with the same infrastructure. In some implementations, each slice may be customized for different services. The NEF 208 may include one or more devices that support exposure of capabilities and/or events in the wireless telecommunications system to help other entities in the wireless telecommunications system discover network services.

The UDR 210 may include one or more devices that provide a converged repository, which may be used by network functions to store data. For example, a converged repository of subscriber information may be used to service a number of network functions. The UDM 212 may include one or more devices to store user data and profiles in the wireless telecommunications system. The UDM 212 may generate authentication vectors, perform user identification handling, perform subscription management, and perform other various functions. The AUSF 214 may include one or more devices that act as an authentication server and support the process of authenticating the UE 102 in the wireless telecommunications system.

The PCF 216 may include one or more devices that provide a policy framework that incorporates network slicing, roaming, packet processing, and/or mobility management, among other examples. The AF 218 may include one or more devices that support application influence on traffic routing, access to the NEF 208, and/or policy control, among other examples. The AMF 220 may include one or more devices that act as a termination point for non-access stratum (NAS) signaling and/or mobility management, among other examples. The SMF 222 may include one or more devices that support the establishment, modification, and release of communication sessions in the wireless telecommunications system. For example, the SMF 222 may configure traffic steering policies at the UPF 224 and/or may enforce UE internet protocol (IP) address allocation and policies, among other examples. The UPF 224 may include one or more devices that serve as an anchor point for intra-RAT and/or inter-RAT mobility. The UPF 224 may apply rules to packets, such as rules pertaining to packet routing, traffic reporting, and/or handling user plane QoS, among other examples. The message bus 226 may represent a communication structure for communication among the functional elements. In other words, the message bus 226 may permit communication between two or more functional elements.

The data network 228 may include one or more wired and/or wireless data networks. For example, the data network 228 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
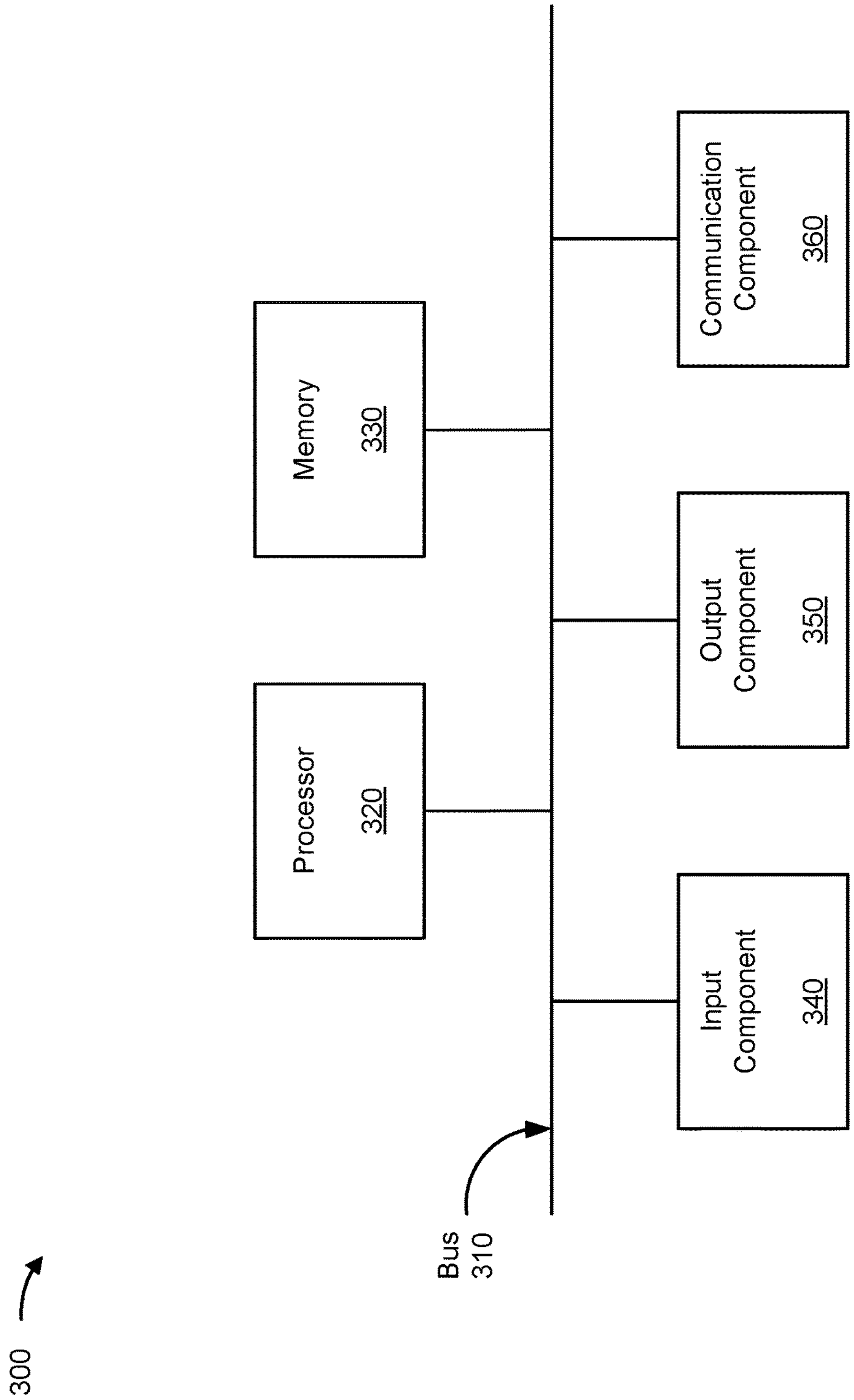
FIG. 3 is a diagram of example components of one or more devices of FIG. 2.

FIG. 3 is a diagram of example components of a device 300 associated with controlling data transfers for UEs in high density areas. The device 300 may correspond to a network device (e.g., NEF-SCEF 112). In some implementations, the network device may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
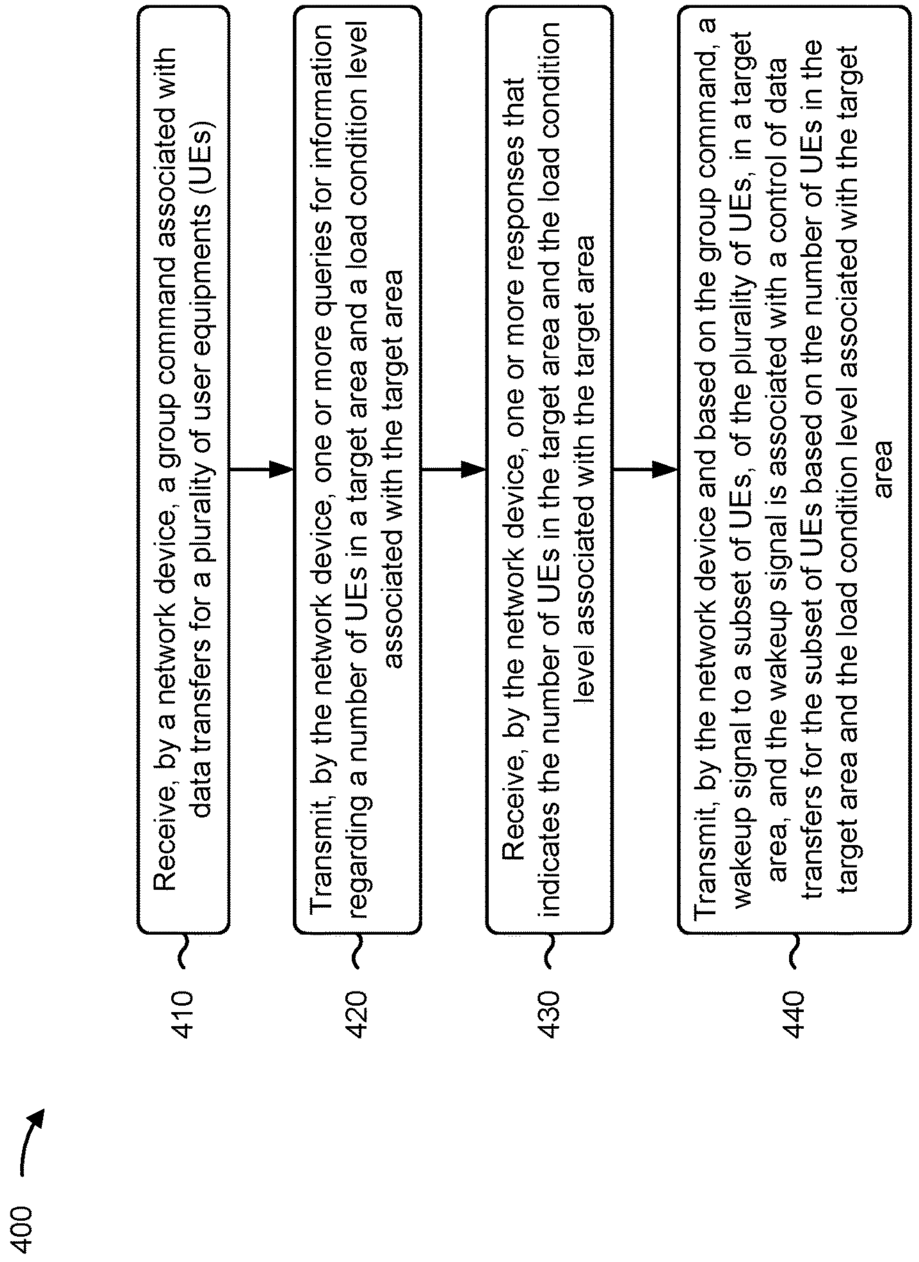
FIG. 4 is a flowchart of an example process associated with controlling data transfers for UEs in high density areas.

FIG. 4 is a flowchart of an example process 400 associated with controlling data transfers for UEs in high density areas. In some implementations, one or more process blocks of FIG. 4 may be performed by a network device, such as an NEF-SCEF. In some implementations, one or more process blocks of FIG. 4 may be performed by another entity or a group of entities separate from or including the network device. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, by the network device, a group command associated with data transfers for a plurality of UEs (block 410). The group command may be received from a customer application server. The data transfers may be uplink data transfers or downlink data transfers.

As shown in FIG. 4, process 400 may include transmitting, by the network device, one or more queries for information regarding a number of UEs in a target area and a load condition level associated with the target area (block 420). The number of UEs in the target area may be per RAT type based on a RAN resource allocation. The target area may be associated with a cell or a base station. The load condition level associated with the target area may account for predicted future traffic associated with the target area.

As shown in FIG. 4, process 400 may include receiving, by the network device, one or more responses that indicates the number of UEs in the target area and the load condition level associated with the target area (block 430). A response that indicates the number of UEs in the target area may be received from an MME or an AMF. A response that indicates the load condition level associated with the target area may be received from an NWDAF.

As shown in FIG. 4, process 400 may include transmitting, by the network device and based on the group command, a wakeup signal to a subset of UEs, of the plurality of UEs, in a target area (block 440). The wakeup signal may be associated with a control of data transfers (or a scheduling of data transfers) for the subset of UEs based on the number of UEs in the target area and the load condition level associated with the target area. The wakeup signal may indicate service gap control information to control UE-network uplink transfer attempts per time interval. The wakeup signal may indicate uplink or downlink rate control per APN for control plane based transfer. The wakeup signal may indicate a user plane data rate. The wakeup signal may be an SMS wakeup command or a NIDD wakeup command. The wakeup signal may be associated with a paced trigger for MO data to multiple target areas.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a network device, a group command associated with data transfers for a plurality of user equipments (UEs); and transmitting, by the network device and based on the group command, a wakeup signal to a subset of UEs, of the plurality of UEs, in a target area, wherein:

the wakeup signal is associated with a control of data transfers for the subset of UEs based on both a number of UEs in the target area and a load condition level associated with the target area;

the number of UEs in the target area is determined per radio access technology (RAT) type based on a radio access network (RAN) resource allocation, and the target area is associated with a cell or a base station; and the load condition level associated with the target area accounts for predicted future traffic associated with the target area.

2. The method of claim 1, further comprising:

transmitting, by the network device, one or more queries for information regarding the number of UEs in the target area and the load condition level associated with the target area; and receiving, by the network device, one or more responses that indicate the number of UEs in the target area and the load condition level associated with the target area.

3. The method of claim 1, wherein the wakeup signal indicates one or more of:

service gap control information to control UE-network uplink transfer attempts per time interval, uplink or downlink rate control per access point name (APN) for control plane based transfer, or a user plane data rate.

4. The method of claim 1, wherein the wakeup signal is a short messaging service (SMS) wakeup command or a non-Internet Protocol (non-IP) data delivery wakeup command.

5. The method of claim 1, wherein the data transfers for the subset of UEs are downlink data transfers or uplink data transfers.

6. The method of claim 1, wherein the wakeup signal is associated with a paced trigger for mobile origination (MO) data to multiple target areas.

7. The method of claim 1, further comprising:
maintaining, by the network device, a cell-radio access technology (RAT) based load map database based on the number of UEs in the target area determined per RAT type and a capacity of the cell associated with the target area.

8. The method of claim 1, wherein the network device is a network exposure function service capability exposure function (NEF-SCEF) in a wireless network.

9. The method of claim 1, wherein transmitting the wakeup signal comprises:
transmitting the wakeup signal only to the subset of UEs in the target area; and
transmitting, after the subset of UEs have had an opportunity to respond, the wakeup signal to another subset of the plurality of UEs in another target area.

10. A network device, comprising:
one or more processors configured to:
receive a group command associated with data transfers for a plurality of user equipments (UEs); and
transmit, based on the group command, a command to a subset of UEs, of the plurality of UEs, in a target area, wherein:
the command is associated with a scheduling of data transfers for the subset of UEs based on both a number of UEs in the target area and a load condition level associated with the target area;
the number of UEs in the target area is determined per radio access technology (RAT) type based on a radio access network (RAN) resource allocation, and the target area is associated with a cell or a base station; and
the load condition level associated with the target area accounts for predicted future traffic associated with the target area.

11. The network device of claim 10, wherein the one or more processors are configured to:
transmit one or more queries for information regarding the number of UEs in the target area and the load condition level associated with the target area; and
receive one or more responses that indicate the number of UEs in the target area and the load condition level associated with the target area.

12. The network device of claim 10, wherein:
the command is a short messaging service (SMS) wakeup command or a non-Internet Protocol (non-IP) data delivery wakeup command; or
the data transfers for the subset of UEs are downlink data transfers or uplink data transfers.

13. The network device of claim 10, wherein the command indicates one or more of:
service gap control information to control UE-network uplink transfer attempts per time interval,
uplink or downlink rate control per access point name (APN) for control plane based transfer, or
a user plane data rate.

14. The network device of claim 10, wherein at least one of:
the command is associated with a paced trigger for mobile origination (MO) data to multiple target areas;
the network device is a network exposure function service capability exposure function (NEF-SCEF) in a wireless network; or
the one or more processors are further configured to maintain a cell-radio access technology (RAT) based load map database based on the number of UEs in the target area determined per RAT type and a capacity of the cell associated with the target area.

15. The network device of claim 10, wherein the one or more processors are further configured to:
transmit the command only to the subset of UEs in the target area; and
transmit, after the subset of UEs have had an opportunity to respond, the command to another subset of the plurality of UEs in another target area.

16. A non-transitory computer-readable medium storing a set of instructions, the set of instructions comprising:
one or more instructions that, when executed by one or more processors of a network device, cause the network device to:
receive a group command associated with data transfers for a plurality of user equipments (UEs); and
transmit, based on the group command, a wakeup signal to a subset of UEs, of the plurality of UEs, in a target area, wherein:
the wakeup signal is associated with a control of data transfers for the subset of UEs based on both a number of UEs in the target area and a load condition level associated with the target area;
the number of UEs in the target area is determined per radio access technology (RAT) type based on a radio access network (RAN) resource allocation, and the target area is associated with a cell or a base station; and
the load condition level associated with the target area accounts for predicted future traffic associated with the target area.

17. The non-transitory computer-readable medium of claim 16, wherein the one or more instructions, when executed by the one or more processors, further cause the network device to:
transmit one or more queries for information regarding the number of UEs in the target area and the load condition level associated with the target area; and
receive one or more responses that indicate the number of UEs in the target area and the load condition level associated with the target area.

18. The non-transitory computer-readable medium of claim 16, wherein:
the wakeup signal is a short messaging service (SMS) wakeup command or a non-Internet Protocol (non-IP) data delivery wakeup command; or
the data transfers for the subset of UEs are downlink data transfers or uplink data transfers.

19. The non-transitory computer-readable medium of claim 16, wherein the wakeup signal indicates one or more of:
service gap control information to control UE-network uplink transfer attempts per time interval,
uplink or downlink rate control per access point name (APN) for control plane based transfer, or
a user plane data rate.

20. The non-transitory computer-readable medium of claim 16, wherein at least one of:
the wakeup signal is associated with a paced trigger for mobile origination (MO) data to multiple target areas;
the network device is a network exposure function (NEF) service capability exposure function (NEF-SCEF) in a wireless network; or
the one or more instructions, when executed by the one or more processors, further cause the network device to maintain a cell-radio access technology (RAT) based load map database based on the number of UEs in the target area determined per RAT type and a capacity of the cell associated with the target area.

* * * * *